(12) United States Patent
Paluncic et al.

(10) Patent No.: US 8,171,815 B2
(45) Date of Patent: May 8, 2012

(54) LUBRICATING PINION AND LUBRICATING DEVICE

(75) Inventors: Zdravko Paluncic, Ludwigshafen (DE); Andreas Schoenfeld, St. Leon-Rot (DE)

(73) Assignee: Lincoln GmbH, Walldorf (DE)

( * ) Notice: Subject to any disclaimer, the term of this patent is extended or adjusted under 35 U.S.C. 154(b) by 329 days.

(21) Appl. No.: 12/528,743

(22) PCT Filed: Jun. 28, 2007

(86) PCT No.: PCT/EP2007/005709
§ 371 (c)(1), (2), (4) Date: Aug. 26, 2009

(87) PCT Pub. No.: WO2008/113396
PCT Pub. Date: Sep. 25, 2008

(65) Prior Publication Data
US 2010/0101352 A1    Apr. 29, 2010

(30) Foreign Application Priority Data

Mar. 16, 2007 (DE) .................... 20 2007 004 103 U

(51) Int. Cl.
*F16H 57/04* (2010.01)
(52) U.S. Cl. ........................................... 74/467
(58) Field of Classification Search ............ 74/462, 74/467, 468; 184/6.12; 264/478; 425/107
See application file for complete search history.

(56) References Cited

U.S. PATENT DOCUMENTS

| 1,836,439 | A | | 12/1931 | Buehler | |
|---|---|---|---|---|---|
| 2,789,311 | A | * | 4/1957 | Holt | 264/318 |
| 4,696,201 | A | * | 9/1987 | Hattori et al. | 74/467 |
| 5,337,626 | A | | 8/1994 | Everts | |
| 5,622,239 | A | * | 4/1997 | Orlitzky | 184/6.12 |
| 5,908,067 | A | | 6/1999 | Carr | |
| 6,615,683 | B1 | * | 9/2003 | Voigt | 74/440 |
| 6,883,397 | B2 | * | 4/2005 | Kimizuka | 74/462 |

FOREIGN PATENT DOCUMENTS

| CA | 2651650 A1 | 11/2007 |
|---|---|---|
| DE | 2509488 A1 | 9/1976 |
| DE | 20121923 U1 | 9/2003 |
| DE | 202006011330 U1 | 9/2006 |
| GB | 1209792 A | 10/1970 |
| JP | 2001099071 A | 4/2001 |
| JP | 2003207028 A | 7/2003 |

OTHER PUBLICATIONS

International Preliminary Report on Patentability issued Oct. 1, 2009 regarding PCT/EP07/05709, 8 pages.
English translation of International Preliminary Report on Patentability issued Nov. 10, 2009 regarding PCT/EP07/05709, 7 pages.

* cited by examiner

*Primary Examiner* — Vicky Johnson
(74) *Attorney, Agent, or Firm* — Senniger Powers LLP

(57) ABSTRACT

The invention relates to a lubricating pinion, particularly for a lubricating device, for the application of a lubricant pumped, for example, through a lubricant pipeline by a lubricating pump from a reservoir onto at least one gear wheel or the like. The lubricant pinion has an external tooth system onto which at least one lubricant outlet discharges. The lubricant pinion is constructed from at least two lubricant pinion parts which can be connected to one another along a preferably radial parting plane. At least one lubricant channel, which can be connected to the at least one lubricant outlet, extends in the parting plane.

14 Claims, 4 Drawing Sheets

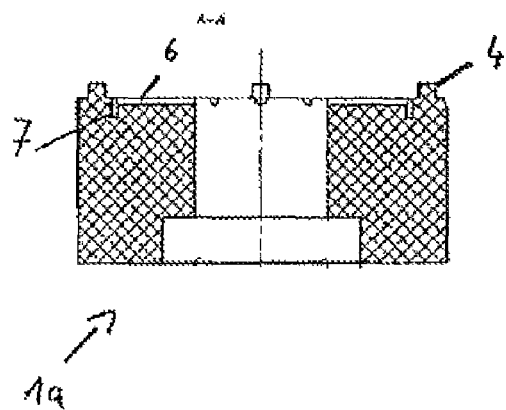
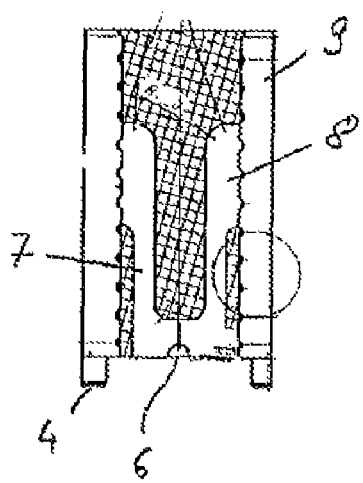
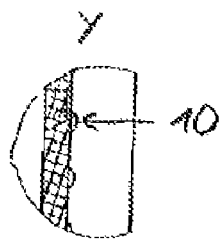
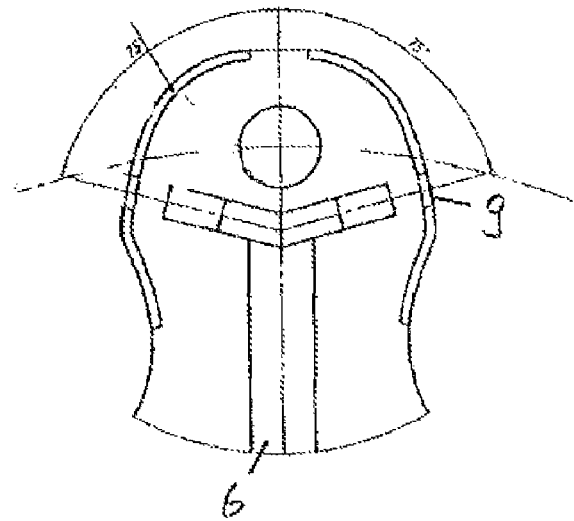

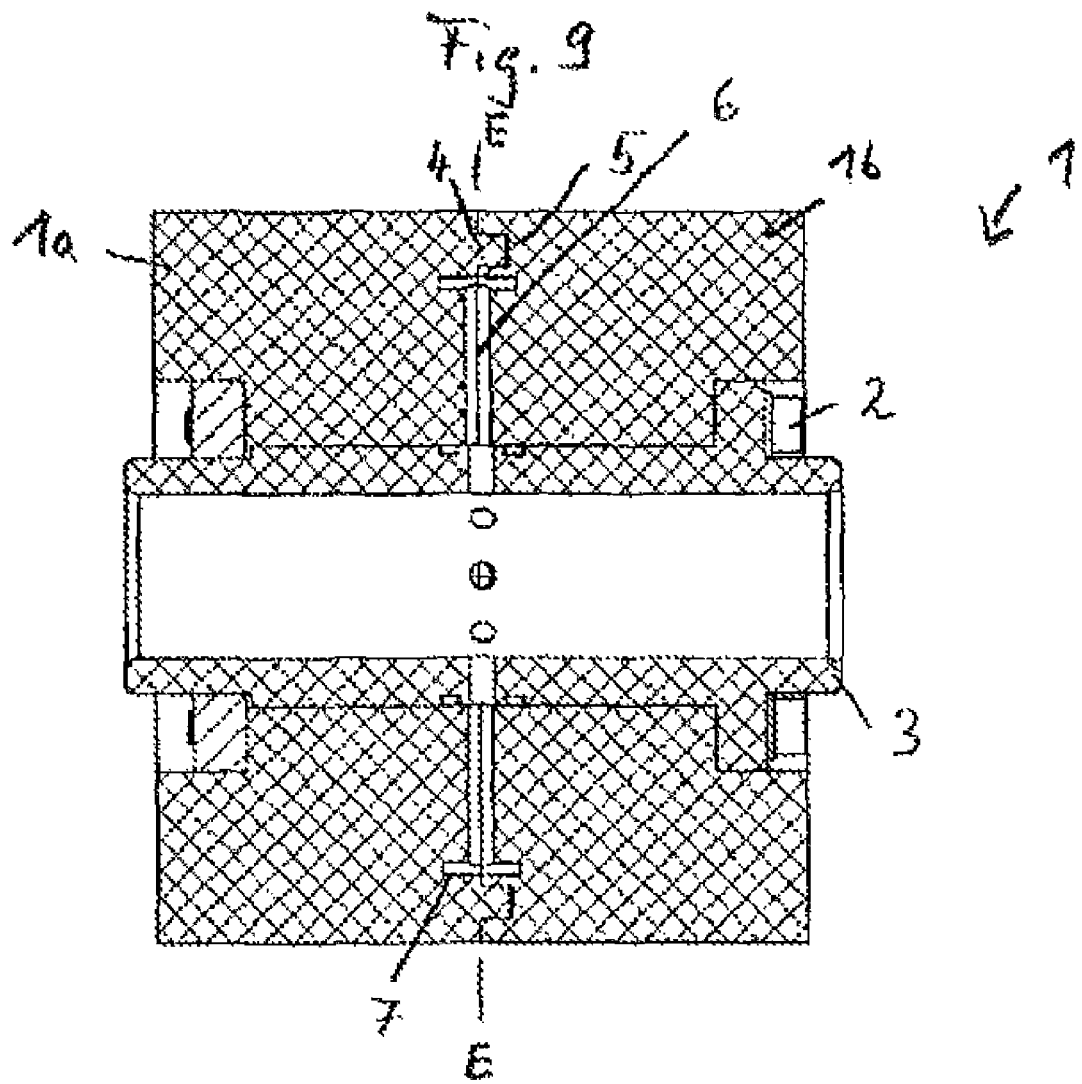

LUBRICATING PINION AND LUBRICATING DEVICE

FIELD OF INVENTION

The invention pertains to a lubricating pinion and a lubricating device for the application of a lubricant, particularly grease, that is supplied, for example, from a reservoir by a lubricating pump through a lubricant pipeline onto at least one gear wheel, and wherein the lubricating pinion features an external tooth system onto which at least one lubricant outlet discharges.

BACKGROUND OF INVENTION

A device of this type for lubricating gear wheels is known, for example, from DE 201 21 923 U1. The lubricating pinion is referred to as a gear rim module in this publication and has the outer contour of a conventional gear wheel with an involute tooth system. An improved lubricating pinion of the above-described type is also known from DE 20 2006 011 330 U1.

SUMMARY OF INVENTION

The present invention, in contrast, is based on the objective of making available a lubricating pinion and a lubricating device of the initially described type that can be manufactured particularly simply and inexpensively.

A lubricating pinion of this invention is adapted for the application of a lubricant onto at least one gear wheel or the like. The lubricating pinion comprises an external tooth system onto which at least one lubricant outlet discharges. The lubricating pinion comprises at least two lubricating pinion parts that can be respectively connected to one another along a radial parting plane. At least one lubricant channel extends in the parting plane and can be connected to the at least one lubricant outlet. The two lubricating pinion parts comprise molded plastic parts that are molded and/or injection-molded in the same tool.

The invention also pertains to a lubricating device with at least one lubricating pinion of the above-described type.

The invention furthermore pertains to a gearbox with at least one gear wheel to be lubricated, wherein the lubricating pinion of the lubricating system meshes with at least one gear wheel. The present invention is not limited to the lubrication of a gear wheel in the form of a cylindrical gear wheel, but can also be used in connection with bevel gears, helical gear wheels, wheels with contrate teeth, worm gears, toothed racks or elliptical gear wheels that respectively mesh with the lubricating pinion.

One embodiment of the invention is described in greater detail below with reference to the drawings. In this respect, all described and/or graphically illustrated characteristics form the object of the invention individually or in any combination, namely regardless of their combination in the claims or their reference to other claims.

BRIEF DESCRIPTION OF THE DRAWINGS

The drawings schematically show:

FIG. 5, a section through the lubricating pinion according to FIG. 2;

FIG. 6, an enlarged section through the detail in FIG. 4;

FIG. 7, an enlarged detail of FIG. 6;

FIG. 8, an enlarged section of FIG. 4; and

FIG. 9, a section through an assembled lubricating pinion according to FIG. 1.

DETAILED DESCRIPTION

The lubricating pinion 1 shown in the figures comprises two lubricating pinion parts 1a, 1b of identical design. The lubricating pinion parts 1a, 1b can be connected to one another along a parting plane that is illustrated in FIG. 9, wherein this parting plane E extends perpendicular to the axis of rotation of the lubricating pinion 1, i.e., the parting plane E extends radially.

Figure 1:
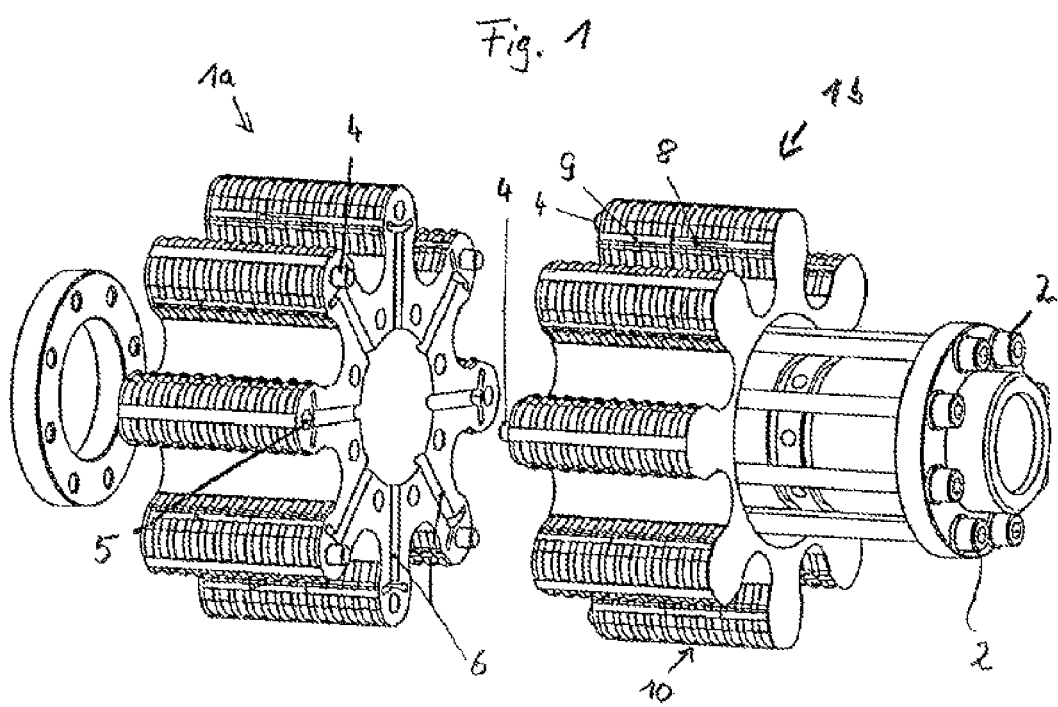
FIG. 1, a perspective representation of an inventive pinion prior to the assembly.
Figure 2:
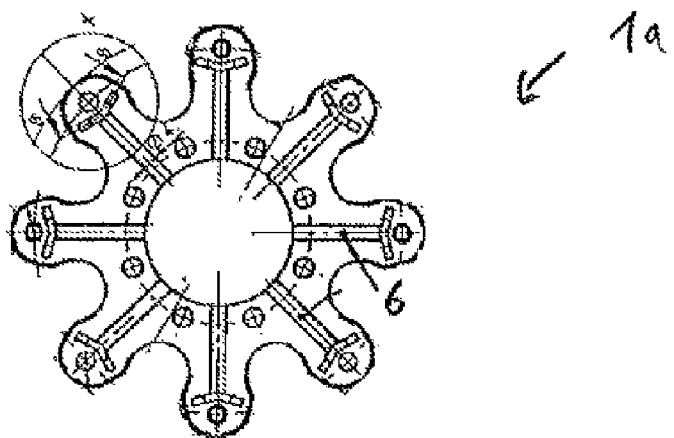
FIG. 2, a front view of a lubricating pinion according to FIG. 1.

According to FIGS. 1 and 9, the two lubricating pinion parts 1a, 1b are connected to one another by means of several screws 2 and a central sleeve-shaped hub 3. In addition, projections 4 and corresponding depressions 5 are provided in the region of the parting plane E such that the two lubricating pinion parts 1a, 1b can initially be attached to one another in a centered fashion.

The figures also show that radial channels 6 extend in the parting plane E, namely in the surfaces of the lubricating pinion parts 1a, 1b on the face sides that point toward one another. These radial channels are connected to a central lubricant supply (that is not shown in the figures) by means of corresponding openings in the hub 3. The respective radial channels 6 consequently are composed of two channel halves that are respectively provided in the two lubricating pinion parts 1a and 1b. Channels 7 that discharge into lubricant outlets 8 in the tooth flanks of the lubricating pinion 1 also branch off these radial channels 6 in the axial direction.

Figure 3:
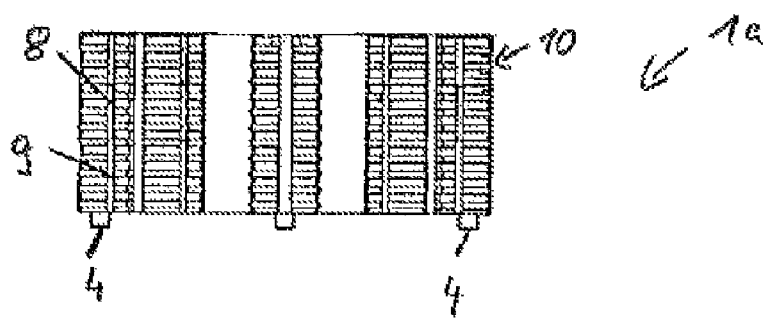
FIG. 3, a top view of the lubricating pinion according to FIG. 2.
Figure 4:
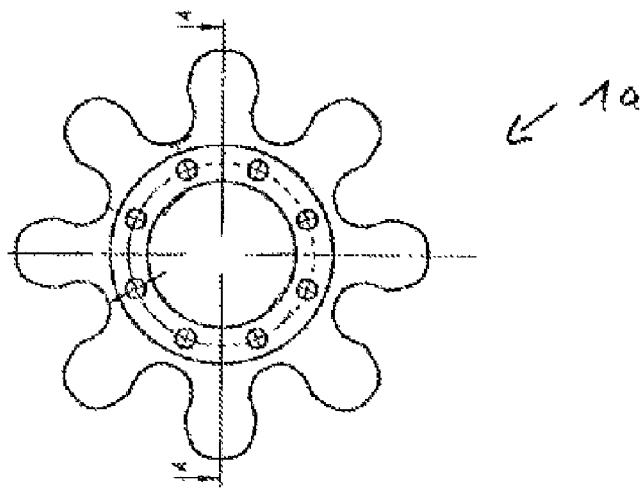
FIG. 4, a rear view of the lubricating pinion according to FIG. 2.

FIGS. 1 and 3 show that axially extending transverse grooves or channels 9 respectively extend in the tooth flanks These transverse grooves or channels are connected to the lubricant outlets 8 on one side and open on the other side in order to deliver the lubricant to the gear wheels to be lubricated. These transverse grooves or channels 9 extend, e.g., over the entire axial length of the lubricating pinion 1.

The outer surface of the tooth flanks is provided with a profiling 10 in order to form pockets or the like in which lubricant can be accommodated. The axially extending channels 7 and the transverse grooves or channels 9 analogously serve for accommodating lubricant in order to allow an emergency lubrication in case the lubricant supply fails.

Accordingly the objectives of this invention are essentially attained in that the lubricating pinion is composed of at least two lubricating pinion parts that can be respectively connected to one another along a preferably radial parting plane, wherein at least one lubricant channel extends in the parting plane and can be connected to the at least one lubricant outlet. In a lubricating pinion, the lubricant is preferably supplied by means of a central lubricant supply that is provided, e.g., in a shaft, wherein the lubricant is initially distributed, e.g., radially from the inside toward the outside and then also axially within the lubricating pinion. This makes it necessary to provide the lubricating pinion with numerous bores and/or channels, some of which are difficult to produce. The invention is based on the idea that the design, e.g., of radially extending channels leading to the individual teeth, can be significantly simplified if these channels are composed of two channel halves that can be connected to one another. To this end, the invention proposes to provide, e.g., two lubricating pinion parts that can be connected to one another along a parting plane in such a way that lubricant channels extend in the parting plane.

A particularly inexpensive manufacture of the lubricating pinion is achieved due to the fact that it is composed of two lubricating pinion parts of at least essentially identical design. An identical design of the lubricating pinion parts to be connected to one another not only lowers the manufacturing costs because fewer different tools must be kept on hand for the manufacture of the lubricating pinion parts, but is also advantageous with respect to warehousing costs because the number of different components required for assembling a lubricating pinion can be kept quite low.

The lubricating pinion parts can be connected to one another, e.g., by means of a screw connection. Alternatively or additionally, it is also possible to provide, e.g., a sleeve-shaped hub, by means of which the lubricating pinion parts can be connected to one another. Furthermore, projections and depressions may be arranged on the lubricating pinion parts such that the projections engage into the depressions in a precisely fitted fashion in order to connect the lubricating pinion parts to one another. This can also simplify the centering or alignment of the parts relative to one another.

If the surface of the lubricating pinion parts features a profiling, e.g., in the region of the external tooth system, small pockets or depressions are formed in which the lubricant can accumulate. This allows an emergency lubrication of sorts, e.g., if the lubricant supply is interrupted.

According to the invention, radially extending and axially extending channels are provided in the lubricating pinion parts, wherein the axially extending channels are connected to the surface of the external tooth system by means of at least one lubricant outlet. Pockets or similar lubricant reservoirs can also be formed in this case in order to allow a certain emergency lubrication.

According to one particularly preferred embodiment of the invention, the teeth of the external tooth system of the lubricating pinion have a shortened tooth flank profile in comparison with an involute tooth system, wherein the addendum and/or the width of the tooth flanks is reduced in the circumferential direction in a tooth flank section that lies radially outside the root circle. In order to reduce the addendum, it is proposed, in particular, to decrease the conventionally provided tooth tip. In this case, the addendum is calculated from half the difference between the outside diameter of the lubricating pinion and the reference circle diameter of the lubricating pinion. In other words, the addendum is the height of the region of each tooth that protrudes radially outward over the reference circle. In an involute tooth system, this is usually a pointed tooth region. If this addendum is reduced in comparison with the addendum of an involute tooth system, the teeth of the lubricating pinion do not penetrate as deeply into the base region of the gear wheel to be lubricated. Surprisingly it was determined that this results in a much better distribution of the lubricant in the regions that are subjected to higher tribological stresses, and that, in particular, an undesirable accumulation of the lubricant is prevented in the base region of the gear wheel to be lubricated. This applies analogously to a reduction of the width of the tooth flanks in the circumferential direction in a tooth flank section that lies radially outside the reference circle such that the lubricant is also prevented from being applied irregularly and unevenly onto the gear wheel to be lubricated and, in particular, from accumulating in the region of the base of the teeth of the gear wheel to be lubricated in this case.

The addendum of the teeth of the external tooth system of the lubricating pinion preferably is reduced in comparison with an involute tooth system by about 25% to about 90%, particularly by about 50% to about 80%. It was determined that it is advantageous if the teeth of the external tooth system of the lubricating pinion have an addendum that is reduced in comparison with an involute tooth system by about 75%. In other words, the addendum now merely amounts to about 25% of the theoretical profile of an involute tooth system. In this case, the teeth of the lubricating pinion are only shortened in the region that lies radially outside the reference circle because the lubricating pinion would no longer be driven by the gear wheel to be lubricated if the teeth are shortened to a value that lies below the reference circle.

It would also be possible that the teeth of the external tooth system of the lubricating pinion have an addendum that is reduced in comparison with an involute tooth system by about 25% to 50%, wherein the external tooth system may have, in particular, an addendum that is reduced by about 25%.

The inventively corrected profile with a reduced addendum can also be changed in comparison with an involute tooth system with respect to the contour of the external tooth system. For example, the teeth of the external tooth system of the lubricating pinion may have a rounded tip contour. This can be provided, for example, with a larger radius in the region of the tooth tip that laterally transitions into respectively smaller radii. The teeth of the external tooth system of the lubricating pinion may have such a rounded tip contour that the width of the tooth flanks is reduced in the circumferential direction in comparison with an involute tooth system in a tooth flank section that lies radially outside the reference circle.

Alternatively, it is also possible, however, to provide the teeth of the external tooth system of the lubricating system with any other tip contour. For example, the tip contour may also be pointed and, in particular, resemble the tip contour of an involute tooth system.

In order to provide a uniform and adequate supply of lubricant to the gear wheel to be lubricated, the lubricating pinion preferably features several lubricant pipelines that originate at a lubricant supply line and respectively discharge into at least one lubricant outlet in one of the teeth. The lubricant supply line may be connected to a reservoir by means of a lubricant pump and, according to one preferred embodiment of the invention, is arranged in the region of the axis of the lubricating pinion or in a region near the axis of the lubricating pinion.

According to an additional refinement, it is proposed that at least two lubricant outlets discharge into each tooth of the lubricating pinion. This makes it possible to supply lubricant to each tooth of the gear wheel to be lubricated.

In order to supply lubricant to both tooth flanks of each tooth of a gear wheel to be lubricated, it is proposed that at least one lubricant outlet is provided in each tooth flank of the lubricating pinion in another embodiment of the invention.

If the outlet openings of the lubricating pinion discharge into the tooth flanks in the region of the reference circle and/or in a region between the reference circle and the dedendum circle, the gear wheel is lubricated at the locations that are subjected to the highest tribological stresses.

The outlet openings in the tooth flanks preferably discharge into transverse grooves or channels that extend in the axial direction of the lubricating pinion, namely over almost the entire axial width of the tooth flanks. This makes it possible to essentially distribute the lubricant over the entire width of the lubricating pinion and of the gear wheel to be lubricated.

It is preferred that the two lubricating pinion parts be molded and/or injection-molded from the same material. The lubricating pinion parts preferably consist of molded plastic parts, particularly of polyurethane (PU).

The invention claimed is:

1. A lubricating pinion for the application of a lubricant onto at least one gear wheel, the lubricating pinion comprising an external tooth system comprising tooth flanks onto which lubricant outlets discharge, wherein the lubricating pinion comprises at least two lubricating pinion parts that can be respectively connected to one another along a radial parting plane, and wherein at least one lubricant channel extends in the parting plane and is connected to respective lubricant outlets, characterized by the fact that axial grooves or channels extend axially in respective tooth flanks, wherein each axial groove or channel is connected to a respective lubricant outlet on one side of the axial groove or channel and open on another side of the axial groove or channel for delivering lubricant to the at least one gear wheel to be lubricated, and that said tooth flanks have an outer surface provided with pockets in which the lubricant can accumulate.

2. The lubricating pinion according to claim 1, characterized by the fact that the two lubricating pinion parts have an at least essentially identical design.

3. The lubricating pinion according to claim 1 or 2, characterized by the fact that the lubricating pinion parts are connected to one another by means of a screw connection and/or a common hub.

4. The lubricating pinion according to claim 1, characterized by the fact that the lubricating pinion parts are connected to one another by means of mutually adapted projections and depressions.

5. The lubricating pinion according to claim 1, characterized by the fact that the external tooth system of the lubricating pinion comprises teeth having a shortened tooth flank profile in comparison with an involute tooth system, and wherein the addendum and/or the width of the tooth flanks is reduced in the circumferential direction in a tooth flank section that lies radially outside a reference circle.

6. The lubricating pinion according to claim 5, characterized by the fact that the teeth of the external tooth system of the lubricating pinion have a rounded tip contour such that the width of the tooth flanks is reduced in the circumferential direction in comparison with an involute tooth system in a tooth flank section that lies radially outside the reference circle.

7. The lubricating pinion according to claim 5 or 6, characterized by the fact that the teeth of the external tooth system of the lubricating pinion have a pointed tip contour similar to that of an involute tooth system.

8. The lubricating pinion according to claim 1, characterized by the fact that at least a few of said lubricant outlets discharge onto the tooth flanks of the lubricating pinion in the region of a reference circle and/or in a region between the reference circle and a dedendum circle.

9. The lubricating pinion according to claim 1, characterized by the fact that the two lubricating pinion parts consist of polyurethane.

10. A lubricating device with at least one lubricating pinion according to claim 1.

11. A gearbox with at least one gear wheel, wherein a lubricating pinion according to claim 1 meshes with the at least one gear wheel.

12. A method for manufacturing a lubricating pinion for the application of a lubricant onto at least one gear wheel, wherein the lubricating pinion comprises an external tooth system onto which at least one lubricant outlet discharges, wherein the lubricating pinion comprises at least two lubricating pinion parts connected to one another along a preferably radial parting plane, and wherein at least one lubricant channel extends in the parting plane and is connected to the at least one lubricant outlet, said method comprising making the two lubricating pinion parts by molding and/or injection molding plastic to form the parts.

13. A lubricating pinion for the application of a lubricant onto at least one gear wheel, the lubricating pinion comprising an external tooth system onto which at least one lubricant outlet discharges, wherein the lubricating pinion comprises at least two lubricating pinion parts that can be respectively connected to one another along a radial parting plane, and wherein at least one lubricant channel extends in the parting plane and can be connected to the at least one lubricant outlet, characterized by the fact that the two lubricating pinion parts comprise molded plastic parts that are molded and/or injection-molded in the same tool, and characterized by the fact that the lubricating pinion parts are connected to one another by means of mutually adapted projections and depressions.

14. A lubricating pinion for the application of a lubricant onto at least one gear wheel, the lubricating pinion comprising an external tooth system onto which at least one lubricant outlet discharges, wherein the lubricating pinion comprises at least two lubricating pinion parts that can be respectively connected to one another along a radial parting plane, and wherein at least one lubricant channel extends in the parting plane and can be connected to the at least one lubricant outlet, characterized by the fact that the two lubricating pinion parts comprise molded plastic parts that are molded and/or injection-molded in the same tool, and characterized by the fact that the two lubricating pinion parts consist of polyurethane.

* * * * *